United States Patent [19]

Schulze

[11] 3,747,074

[45] July 17, 1973

[54] METHOD OF AND APPARATUS FOR BAUD RATE DETECTION

[75] Inventor: Fritz H. Schulze, St. Paul, Minn.

[73] Assignee: Comteu, St. Paul, Minn.

[22] Filed: Mar. 17, 1972

[21] Appl. No.: 235,568

[52] U.S. Cl...... 340/172.5, 179/15 BA, 179/15 BV, 325/320

[51] Int. Cl............................... G06f 3/04, H04j 3/00

[58] Field of Search.................................. 340/172.5; 179/15 BA, 15 BV; 325/320

[56] References Cited

UNITED STATES PATENTS

| | | | |
|---|---|---|---|
| 3,668,645 | 6/1972 | Reymond et al | 340/172.5 |
| 3,670,250 | 6/1972 | Fritkin | 325/320 |
| 3,454,718 | 7/1969 | Perreault | 325/320 |
| 3,403,226 | 9/1968 | Wintringham | 179/15 BV |
| 3,665,417 | 5/1972 | Low et al | 340/172.5 |

*Primary Examiner*—Gareth D. Shaw
*Attorney*—Alfred E. Hall

[57] ABSTRACT

A communication system with baud rate detection capability. In a preferred embodiment of the system, the system includes a processor, a plurality of terminals, and a communication device for coordinating transmission of communications between the processor and terminals at a variety of baud rates. Each baud rate of a system corresponds to a unique baud-rate-code and each baud-rate-code is an interval of time. The signal by which each communication is transmitted includes a baud-rate-code as represented by at least one time interval between signal state transitions The communication device detects the signal state transitions representative of the baud-rate-code and concurrently records the time of occurrence of each detected transition. From a pair of recorded times, a transition interval is computed and correlated with one of the baud-rate-code time intervals to identify a correlated baud-rate-code. The baud rate corresponding to the correlated baud-rate-code is indicated and a transmission of a communication is decoded in accordance with the indicated rate.

11 Claims, 1 Drawing Figure

METHOD OF AND APPARATUS FOR BAUD RATE DETECTION

BACKGROUND AND FIELD OF THE INVENTION

This invention relates to baud rate detection in general and in particular to detection of the baud rate of communications of a data processing system wherein a communications device (CD) coordinates communications between a data processor and a plurality of terminal devices.

In the application of Duane H. Anderson filed concurrently herewith, of the same title as, and assigned to the same assignee as the present application, there is described a baud rate detection approach wherein the time occurrences of changes of state, transitions, of a baud-rate-code in a signal are employed to determine the signal baud rate. In an embodiment of that invention incorporated into a data processing system, a CD when conditioned to operate in a baud rate detection mode generates and transmits to the data processor a "baud-rate-detection-interrupt" in response to detection of a signal state transition. Each baud rate is assigned a baud-rate-code and, as implied above, the unique feature of the baud-rate-code is the interval, i.e., the time, between signal state transitions. In response to each such interrupt, the data processor stores the time at which it processed the interrupt thereby permitting determination of baud rate by operation upon the stored times to compute the interval between transitions, which computed interval when correlated with the baud-rate-code time intervals identifies the baud rate of the transmission.

The aforedescribed signal state transition baud rate detection approach represents a great advance in the art, it permits great flexibility in the choice of the bit pattern used to specify baud rates because no particular bit pattern is required. A variety of bit patterns may each specify the same baud rate because the baud-rate-code is independent of the state of the bits used to specify the baud-rate-code. The bit pattern which specifies a baud-rate-code need only include properly spaced transitions since signal state transitions, rather than the actual state of individual bits, are detected. Furthermore, the present invention represents an even further advance in that provision is made for storing the time of a transition concurrent with its occurrence without need for generation of an interrupt thereby providing an indication of the transition time of occurrence which is exact and free of errors, such as errors resulting from delays attendant with processing of an interrupt.

BRIEF DESCRIPTION OF INVENTION

Briefly, the invention comprises a communication system for coordinating communications between a processer and a plurality of terminal devices. According to systems convention, the system baud rates are specified by a set of baud-rate-codes. Each rate of transmission, each baud rate that is, corresponds to a unique baud-rate-code. Each baud-rate-code is at least one interval of time represented in a transmission of a communication as the interval between a pair of signal state transitions. The system includes means for monitoring the state of a received signal for a change of state. Concurrent with detection of a change of state, recording means record the time of a timing means as a transition time. Following detection of a predetermined number of transitions, arithmetic means operate on a pair of said transition times to compute the transition interval therebetween, correlates the computed transition interval with one of the set of baud-rate-code time intervals to identify a correlated baud-rate-code, and indicates the baud rate corresponding to the correlated baud-rate-code. Baud rate decoding control means condition a communication device to decode the communication in accordance with the baud rate indicated by the arithmetic means.

In one embodiment of the invention, the CD is a peripheral control unit, specifically, a communication control unit, which is linked to a data processor through one or more input/output (I/O) channels and is linked by communication lines to remote terminals. The CCU includes a transition timer and an input shift register connected through selection gates to each of a plurality of data (communication) lines. Each data line is selected in sequence and for each, if any, line which has established a baud rate detection mode of operation, the state of the signal on the line is monitored and upon detection of a change of state the time of the transition timer (a "transition time") is transferred to the processor to "capture" the time occurrence of the transition. The processor stores each such transition time and upon receipt by the processor of the last of a predetermined number of transition times the processor is interrupted to initiate a software routine which includes arithmetic operations for operating upon said transition times to determine the baud rate specified by the baud-rate-code of the detected transitions.

DETAILED DESCRIPTION OF DRAWING

Figure 1:
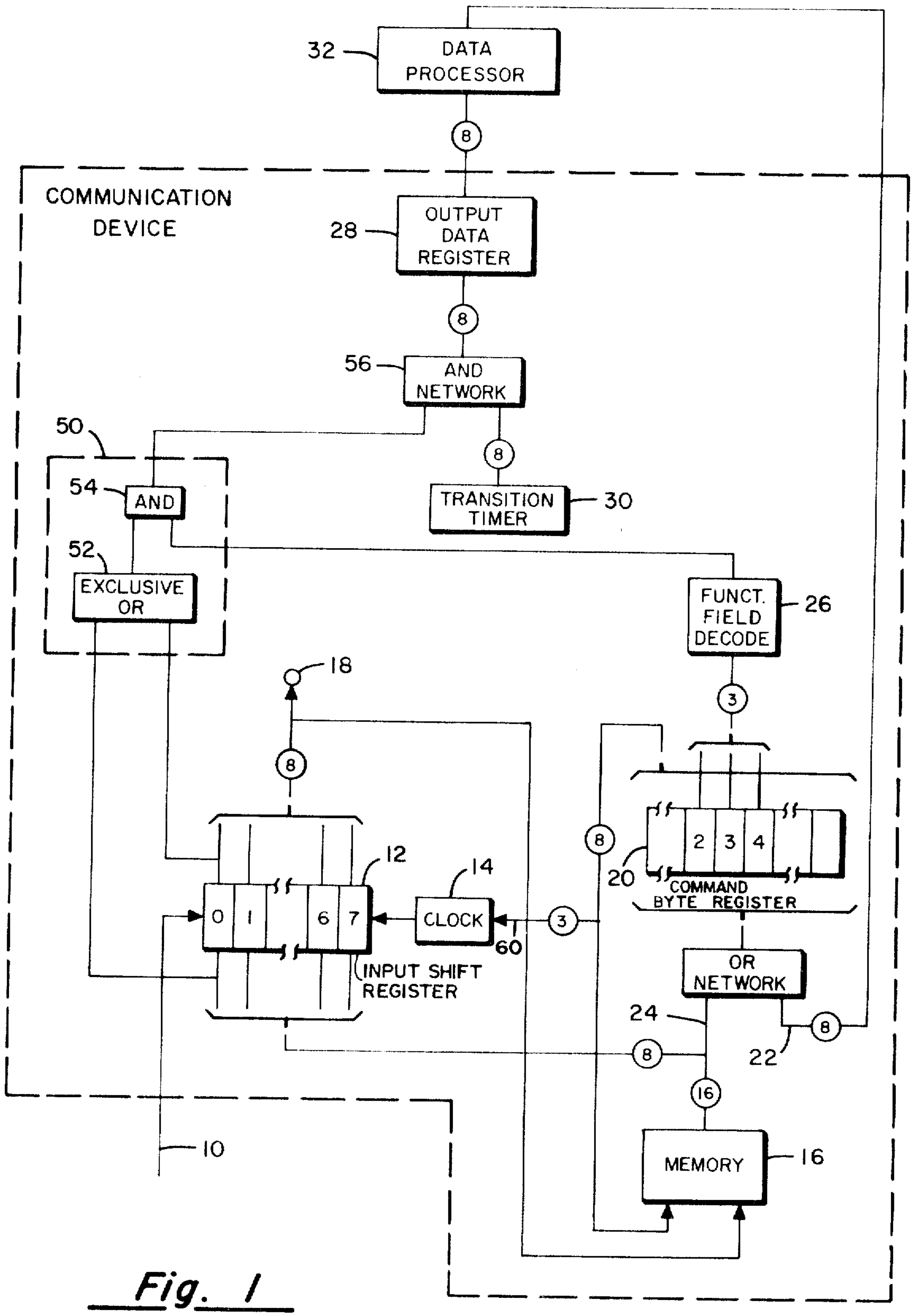
FIG. 1 is a basic logic diagram showing a preferred embodiment of the invention for a data processing system, including the logic of a communications device for performing baud rate detection according to the present invention.

FIG. 1 is a basic logic diagram which illustrates how the addition of a relatively small amount of logic to the existing logic of a communications device facilitates baud rate detection by the device. To most clearly and concisely illustrate and to aid in succintly describing the principles of the invention, only a single communication line and so much of the CD logic is required to carry out the baud rate detection is shown in FIG. 1. However, the description of FIG. 1 shall when appropriate include references to how various elements illustrated therein function in an embodiment including a plurality of communication lines. As implied above, FIG. 1 illustrates both logic normally included in the CD and logic added for performing the baud rate detection function. Before considering the logic added specifically for baud rate detection, the logic normally included in the CD and its normal CD function shall be described first.

Referring now to FIG. 1, a data line 10 is a data input to an input shift register 12. Normally, data is received bit serially on data line 10 and is strobed into shift register 12 in response to strobe or gating signals produced by clock 14. According to standard asynchronous mode of operation, data line 10 is selected in sequence with each of the other data lines (not shown). Each selection is referred to as a "line scan" and the entire selection sequence, one line scan for each data line, is referred to as a "line scan cycle." During a line scan, a bit is strobed from a data line into register 12 after which the contents of the register are transferred bit-parallel to several destinations one of which is a character-assembly memory 16. The other destinations are immaterial to a consideration of baud rate detection and shall merely be signified by reference numeral 18.

The normal CD function of clock 14 includes generation of strobe and shift pulses for controlling the operation of shift register 12, each such shift pulse causing each bit of the register to shift to the next higher bit position in the register and each strobe pulse resulting in setting of the shift register least significant bit position to the same state as the selected data line, i.e., resulting in strobing the bit on the data line into the least significant bit of the shift register. As subsequently described in greater detail, each line scan cycle time is always less than a bit time, and strobing an shifting of the shift register is limited to one line scan out of the number of line scans occurring during a bit time. In an asynchronous CD such as is illustrated in FIG. 1, an important but well known manner of operation of clock 14 is generation of the strobe and shift pulses at an appropriate time; specifically, at approximately the mid-point of each bit time. In the embodiment illustrated in FIG. 1, clock 14 includes a line scan counter and the command word which is decoded in command byte register 20 includes a "line scan count" field which specifies the number of line scans which clock 14 is to count before generating the strobe and shift pulses. After a start bit is detected, the clock 14 line scan counter is stored in memory 16 as the command word line scan count field. When the appropriate number of line scans have been counted, clock 14 generates shift and strobe pulses as hereinbefore described.

The normal CD function of memory 16 includes storing of a partially assembled character and a "command word" for all data lines except the selected data line. During a line scan, the partially assembled character (partial) character), if any, for the selected line and its associated command word is transferred from memory 16 to, respectively, shift register 12 and command byte register 20. For each line scan that correspomds to the center of a bit time, the bit on the selected data line is strobed into the register to form a new partial or to complete a character. The contents of shift register 12 and the associated command word in command byte register 20 are then transferred to memory 16. When the contents of shift register 12 are transferred to memory 16 they are stored in an address corresponding to the data line which was just scanned. In normal CD operation a line scan is executed for each of the other data lines after which another line scan is executed for the first mentioned line. It can thus be seen that for each line scan, the least significant bit of register 12 represents the state of the selected line at a prior time, specifically, the time of a previous corresponding scan.

Command byte register 20 is shown to have an 8 bit input the source of which is either from a data processor 32 via line 22 or from memory 16 via line 24. In normal CD operation, register 20 initially receives a command from the processor. In FIG. 1, the path between the processor 32 and the command byte register 20 is shown as a direct interconnection in the form of an eight conductor cable 22 though it will be appreciated that the path would in most instances include other logic of the CD such as a register analogous to data register 28. A command in register 20 is decoded by decode logic including function field decode logic 26 which is shown to decode bits 2, 3, and 4 of the command word. During a line scan, the operation specified by the command word and as decoded by the decode logic is executed after which the command word is returned to memory until the corresponding line scan of the next line scan cycle.

The balance of the CD logic used in conjunction with the special baud rate detection logic is the CD data register 28. The data register 28 is used during normal CD operation to hold a character assembled by shift register 12 during transfer of the character from the CD to the processor.

Certain logic of a data processor is also used in carrying out baud rate detection for the embodiment of the invention illustrated in FIG. 1. In FIG. 1 the data processor is shown generally as 32. The data processor logic employed for baud rate detection includes the processor I/O, arithmetic, and control sections operated in accordance with instructions to perform the following operations: computation of transition intervals from recorded transition times; correlation of a computed transition interval with one of a set of baud-rate-code time intervals to identify a correlated baud-rate-code; and, control of I/O transfers between the CD and the processor. The foregoing described logic, including the logic of data processor 32, is not new per se, but is typical of that used in the art for coordinating communications between a processor and a plurality of terminals, e.g., teletypewriters, by a communication device such as a communication control unit, neither are the instructions or the general instruction sequences for operating the processor logic new or other than instructions and instruction sequences normally used to perform like operations.

The balance of the logic of FIG. 1 which shall now be described is used solely for the purpose of baud rate detection and consists only of a transition timer 30 and transition detection logic 50 the latter of which consists of exclusive OR gate 52 and AND gate 54. During a baud rate detection operation, the line scan count field transferred from command byte register 20 to shift register 12 specifies a count of zero with the result that data line 10 is strobed every line scan. Therefore, the state of the least significant bit of register 12 "follows" the state of data line 10. The least significant bit output of register 12 is coupled to an input of the exclusive OR 52 of transition detection logic 50. The other input to OR 52 and the output of OR 52 is the least significant bit line from memory 16 and an input to AND 54, respectively. The other input to AND 54 is from the function field decode logic 26. The AND 54 output is applied to the AND network 56 as is the output of transition timer 30. The AND network 56 includes an AND gate for each bit position of timer 30. The foregoing logic described with reference to FIG. 1 allows a plurality of terminal devices which transmit at a variety of baud rates to share a common communication line. The operation of the system by which the baud rate of a particular transmission is determined shall be described following a brief consideration of the baud-rate-codes by which each of the system baud rates is defined.

As previously explained, each baud-rate-code is an interval of time. Normal variations in the time of a transmitted signal such as the variations caused by telegraph distortion, for reasons explained in greater detail in the aforementioned Anderson application, make it desirable that a baud-rate-code be greater than a bit time. Such variations also dictate the tolerance of a baud-rate-code time interval. In a data processing application such as that illustrated in FIG. 1, it is convenient to express a baud-rate-code interval and its tolerance as a range thereby facilitating correlation of a computed transition time with a baud-rate-code time interval by means of a range search as described hereinafter in greater detail. Table 1 below lists a set of ranges for seven different baud rates and a baud-rate-code interval equal to nine bit times, i.e., 9 bits in length. In Table 1, Table Entry Numbers are given in Column 1; Baud Rate is given in Column 2; and, a Baud-Rate-Code for each baud rate of Column 2 is given in Column 3 as a range (a range of time in milliseconds). Each baud-rate-code in Table 1 is accurate for telegraph distortion of up to 30 percent but does not make allowance for other types of errors since most other errors are more system dependent.

TABLE 1, BAUD-RATE-CODES

| Col. 1 Entry No. | Col 2 Baud Rate | Col. 3 Range | |
|---|---|---|---|
| | | Min. | Max. |
| 0 | 50 | 173 | 187 |
| 1 | 75 | 115 | 125 |
| 2 | 100 | 86 | 94 |
| 3 | 150 | 57 | 63 |
| 4 | 300 | 28 | 32 |
| 5 | 600 | 14 | 16 |
| 6 | 1800 | 4 | 6 |

The foregoing Table 1 includes only a single range for each baud-rate-code. In some instances, however, it may be desirable or perhaps even necessary to represent a baud-rate-code as a combination of two or more ranges. For example, in a system including baud rates of 100, 110, 134.5 and 150 baud, the ranges of adjacent baud rates can overlap requiring a second set of ranges. Of course, a second set of ranges requires detection of at least one additional transition.

Referring again to FIG. 1, a baud rate detection operation is initiated by the loading of a baud rate detection command (BRDC) into command byte register 20, the exact stimulus causing (means initiating) such loading being immaterial. The remainder of this description of the operation shall assume that the command resides continually in register 20 and that the detection operation is for data line 10 and is itself continuous. It will be appreciated, however, that the operation could be segmented, and actually is segmented in a plural line CD device. For such a plural line CD device, memory 16 stores the BRDC during the portion of a line scan cycle when lines other than data line 10 are being selected. Because the total line scan cycle time in such an asynchronous communications system is only a fraction of a bit time, the error in the difference between an actual and an indicated transition time is negligible, particularly in those instances when a transition interval is a plurality of bit times in length. (For an embodiment in which the fastest Baud Rate is 1,800 baud which is 555 micro seconds per bit, and in which there are 16 line scan per line scan cycles, the line scan cycle is 35 micro seconds which amounts to a line scan time of approximately 2.18 micro seconds for each of the 16 line scans of the cycle. Thus, even for this fastest baud rate of the embodiment, each line is selected approximately 16 times per bit and the greatest possible error between the actual occurrence and the detection and recording of a transition is therefore less than a line scan cycle time, specifically less than about 33 micro seconds.)

Upon loading of a BRDC into register 20 for data line 10, decode logic 26 decodes the command and enables one input to AND 54. The most significant three bits of command byte register 20 are provided to clock 14 via lead 60. As previously explained, for a BRDC these three bits specify a line scan count of zero. Consequently, the data line 10 is strobed every line scan and thus the least significant bit of register 12 follows the signal on data line 10. As determined by system convention, either, the least significant bit of the address in memory 16 for data line 10 is pre-written to the same state as the initial state of the transmitting signal, or transitions of the first line scan are ignored, or the signal in which the baud-rate-code is represented is generated such that a transition does not occur during the first line scan. If it were intended that a transition be detected during the first line scan, e.g., that the transition of the leading edge of a start bit when the signal goes from a mark to a space state be detected, a transition would not be detected if the initial state of bit zero of the memory was a space state. Errors could also be produced if a transition was not to occur during the first line scan, namely, a false transition would be produced whenever the "old" and "new" state signals were initially different. As is well known in the communication art, the start bit leading edge in asynchronous communications is a transition from a mark to a space state and, for the embodiment illustrated in FIG. 1, it has been found convenient to utilize the leading edge of the start bit as the first transition. For the illustrated embodiment, normal completion of each transmission leaves the least significant bit of the register 12 in a mark state to pre-write to a mark state the least significant bit of the memory 16 address corresponding to the line on which the transmission was completed. Consequently, the leading edge of the start bit can be detected during a first line scan as the first transition.

After each line scan of data line 10, the state of shift register 12 bit O (least significant bit) is transferred to memory 16. This signal state is applied to one input of exclusive OR 52 as the old state signal when the line is again selected during the subsequent line scan cycle. It should be recalled, however, that for purposes of this illustrative example it was assumed that detection was to be continuous rather than segmented and hence data line 10 would be selected on consecutive line scans until the detection operation was completed.

The other input to OR 52 is the register 12 least significant bit output, the new state signal. Until such time as the signal state of data line 10 changes, both inputs to exclusive OR 52 are the same and thus OR 52 is inactive. Upon a change in state of data line 10, the register 12 least significant bit output follows the change with the result that the exclusive OR 52 inputs differ thereby activating OR 52. With OR 52 active, the input of AND 54 coupled thereto is likewise active to activate AND 54 since the other input to AND 54 is also in an active state, having been activated and thereafter continuing to be held active during each line scan of the data line 10 by function decode logic 26. With AND 54 active, the contents (time) of transition timer 30 are applied through AND network 56 to data register 28. From data register 28, this "captured" time occurrence or transition time is transferred to processor 32 where it is stored for future use in computation of the baud rate. Upon conclusion of the line scan during which the transition occurred, the contents of shift register 12 are transferred to memory 16 thereby updating the old-state signal. With the old-state signal updated, both inputs to exclusive OR 52 are again alike to inactivate OR 52 which in turn inactivates AND 54. Upon the next change of state of the signal on data line 10, the transition time is captured as previously described. After this second transition is detected, it is then possible to operate on the pair of transition times and determine the Baud Rate although if desired transition times of additional transitions can be recorded. For a discussion of the advantages resulting from such detection of additional transitions see the description of the waveform of FIG. 1 of the aforementioned application of Duane H. Anderson.

When the transition interval is equal to a bit time, determination of the baud rate need of course consist only of subtraction of the first time from the second followed by taking the reciprocal of the difference. For the present example, it shall be assumed that the transition interval is greater than a bit time. Accordingly, determination of the baud rate for the present assumed operation would consist of computing a transition interval by subtracting the first time from the second and then correlating the computed interval with a baud-rate-interval, the correlated baud-rate-interval corresponding to the baud rate. For the logic of FIG. 1, such determination can conveniently be effected as follows.

The processor 32 logic was previously stated to include the I/O logic of a processor. For the purpose of explanation it shall be assumed that an I/O buffer control word (BCW) control storage of the transition times, and further assumed that the BCW consists of three fields: an address field, a function field, and a buffer length field. The address field specifies the address in memory at which the I/0 logic is to store a character upon receipt of the character; the function field specifies the operation which the I/O is to perform upon completion of the buffer operation; and the buffer length field specifies the number of buffer characters required to complete the buffer operation.

For a baud rate detection operation, each buffer character is a transition time and thus the buffer length field specifies the number of transitions to be detected. During a baud rate detection operation, each transition time of a detected transition is transferred from the data register 28 to the processor 32 as a buffer character, and the processor 32 stores the character at the address specified in the BCW address field, increments the address field, and decrements the buffer length field. The second captured time is handled in a like manner and decrements the buffer length field to zero since for the present assumed conditions only two transitions are to be detected. Upon decrementing the buffer length field to zero, the I/O executes the function specified by the BCW function field; namely, the I/O generates an internal interrupt which causes the processor to determine the baud rate represented by the transition interval of the stored transition times.

The determination, as previously described, includes computation of the transition interval between a pair of transition times, and correlation of the computed transition interval with a baud-rate-code interval. Such a correlation can be effected by either hardware or software, e.g., by a read-only memory or by a range search routine of the type whereby the transition interval is compared with successive entries in a table such as a table of ranges like those of the foregoing Table 1. During such a range search, for each entry that does not compare, a counter is updated. When a table entry and the transition interval do compare, the count stored in the counter contents identify the Table Entry number which corresponds to the baud rate of the correlated baud-rate code. The count with perhaps further modification such as the addition of function fields bits and the like, is transmitted to the CD as a command word, which, when decoded by the function field decode 26, conditions the clock 14 to strobe the communication into shift register 12 at the baud rate specified by the baud-rate-code of the communication.

While the foregoing detailed description is with reference to an embodiment of the invention specifically intended for use in a data processing system, the invention for which Letters Patent is sought is not limited to such an embodiment but includes all variations and modifications of the embodiment made in adapting the invention for other applications. An example of such a variation is an application in which it is either impractical or impossible to derive the old state signal from the least significant bit of an input shift register such as register 12 of FIG. 1. In such an application, data line 10, instead of being provided as the bit 0 input of register 12, could be provided as an input to any of a variety of well known delay circuits and the delay circuit output provided as an input to exclusive OR 52 is place of the register 12 bit zero output. Such a delay circuit could be constructed by coupling data line 10 to both the set and clear inuts of a conventional flip-flop, one flip-flop being coupled directly to the data line 10 and the other coupled through an inverter whereby one signal state sets whereas the other signal state clears the flip-flop. The delay for a flip-flop delay circuit as described is commonly referred to as the delay of one level of logic, additional delays can be provided by adding additional levels of logic or by adding circuits the specific function of which is to delay a signal. Another such modification is in an application wherein the communication device receiving a transmitted signal includes, an addition to transition detection and timing means, arithmetic means for operating upon transition times to determine the baud rate thus eliminating any need for a separate processor such as the processor 32 of FIG. 1. These and other modifications too numerous to mention are included within the scope of the present invention as defined by the claims which follow.

What is claimed is:

1. A communication system for coordinating communications between a processor and a plurality of terminal devices wherein the baud rates of transmitting a communication in the system are defined by a set of baud-rate-codes, each baud rate corresponding to a unique baud-rate-code and each of which baud-rate-coder is at least one interval of time and is represented in a transmission of a communication as the interval between a pair of signal state transitions, comprising:

A. monitoring means for detecting signal state transitions representative of a baud-rate-code;

B. timing means for providing an indication of time;

C. recording means responsive concurrent with said monitoring means detecting a said transition to record a said indication of time as a transition time;

D. arithmetic means for computing the transition interval between a pair of said transition times, for correlating a said computed transition interval with a baud-rate-code time interval to identify a correlated baud-rate-code, and for indicating the baud rate corresponding to said correlated baud-rate-code; and E. baud rate decoding control means responsive to said indicated buad rate to condition a communication device to decode the communication at the indicated baud rate.

2. A communication system according to claim 1 wherein said monitoring means comprises:

1. new-state signal means for providing a representation of the signal state of a signal as it is received, which representation is a new-state signal;
2. old-state signal means for providing a representation of the signal state of said received signal a predetermined period after it has been received; and
3. transition detection logic coupled to receive both the new-state and the old-state signals for providing an output indicative of the occurrence of a transition whenever the signal states of the old-state and new-state signals differ.

3. A communication system according to claim 2 wherein said transition detection logic comprises an exclusive OR gate which has said old-state and new-state signals as its inputs whereby whenever the signal states of the old-state and new-state signals are the same said exclusive OR gate is inactive but whenever the signal states of the old-state and new-state signals differ, the OR gate is active to provide an output signal indicative of the occurrence of a transition.

4. A communication system according to claim 2 wherein the monitoring means is included in a communications control unit in which transmission signals are received on a plurality of cyclically scanned data lines and in which each data line is scanned for one line scan time during such line scan cycle, and wherein said new-state means comprises an input shift register of a communication control unit which register is sequentially coupled to said data lines and when the communication control unit is conditioned to operate in a baud rate detection mode receives a signal from a said data line and provides the signal as the new-state signal on the register least significant bit output; and said old-state means comprises a memory of said communication control unit coupled to receive the shift register least significant bit output and one line scan cycle after such receipt to provide to the transition detection the logic the signal state of said least significant bit as an old-state signal.

5. A communication system according to claim 4 wherein said timing means is included in said communication control unit and comprises:

1. a ring counter;
2. a data register the inputs of which are coupled to outputs of said ring counter and which data register inputs are controlled in accordance with said transition detection logic output indicative of a transition to be enabled and to receive the count of said ring counter.

6. A communication system according to claim 5 wherein said recording means is a memory of a data processor and which data processor is connected to the data register of said communication control unit;

said arithmetic means is the arithmetic section of said data processor, which arithmetic section is operated in accordance with instructions to operate upon at least one pair of said transition times to compute the transition interval thereof and is operated in accordance with instructions which correlate a said computed transition interval with a baud-rate-code interval range, which range is included in a table of ranges in which each range corresponds to a baud rate, and which instructions search said range table for the table entry corresponding to said computed transition interval.

7. A communication system according to claim 6 wherein said decoding control means comprises a selectable period clock in the communication control unit, the output of which clock is applied to a strobe input of said shift register, which clock includes selection gates responsive to a baud rate indication indicated by said arithmetic means and transmitted by the processor to the communication control unit selection gates to condition said communication device to receive a communication associated with a said baud-rate-code at the baud rate corresponding to said baud-rate-code.

8. In a communication device for receiving communications at a variety of baud rates, each of which baud rates corresponds to a unique baud-rate-code, each of which baud-rate-codes is at least one interval of time represented in a transmission of a communication as the interval between a pair of signal state transitions, baud rate detection means for determining the transition interval between a pair of signal state transitions, comprising:

A. monitoring means for detecting signal state transitions representative of a baud-rate-code;

B. timing means for providing an indication of time; and

C. recording means responsive concurrent with said monitoring means detecting a said transition to record a said indication of time as a transition time.

9. Apparatus according to claim 8 wherein said baud rate detection means further comprises:

D. arithmetic means for computing the transition interval between a pair of said transition times, for correlating a said computed transition interval with a baud-rate-code time interval to identify a correlated baud-rate-code, and for indicating the baud rate corresponding to said correlated baud-rate-code; and E. baud rate decoding control means responsive to said indicated baud rate to condition a communication device to decode the communication at the indicated baud rate.

10. A method of coordinating communications in a communication system wherein communications are transmitted at a variety of baud rates and each rate of transmitting a communication in the system corresponds to a unique baud-rate-code, each of which baud-rate-codes is at least one interval of time, represented in a transmission of a communication as the interval between a pair of signal state transitions, comprising the steps of:

1. providing an indication of time;
2. detecting a signal state transition of a signal representative of a baud-rate-code;

3. recording an indication of time as a transition time concurrent with detecting a said transition;
4. determining the transition interval between at least one pair of said transition times, and indicating the baud rate corresponding thereto; and
5. conditioning a communication device to decode a transmission of a communication at the indicated baud rate.

11. A method of coordinating communications according to claim 10 wherein said step of determining and indicating the baud rate, comprising the sub-steps of:

A. computing the transition interval between a pair of said transition times;
B. correlating said computed time intervals with a said baud-rate-code time interval to identify a correlated baud-rate-code; and
C. indicating the baud rate corresponding to a said correlated baud-rate-code.

* * * * *

UNITED STATES PATENT OFFICE
CERTIFICATE OF CORRECTION

Patent No. 3,747,074 Dated July 17, 1973

Inventor(s) Fritz H. Schulze

It is certified that error appears in the above-identified patent and that said Letters Patent are hereby corrected as shown below:

On the cover sheet [73] "Comteu, St. Paul, Minn." should read -- Comten, St. Paul, Minn. --. Column 1, line 13, after "application," insert -- serial number 235,836 --. Column 3, line 40, "(partial) character)" should read -- (partial character)--.; line 43, "correspomd" should read -- corresponds --. Column 5, line 61, before "per", "scan" should read -- scans --. Column 8, line 29, "is" should read -- in --; line 42, "an" should read -- in --; line 57, "coder" should read -- codes --.

Signed and sealed this 26th day of March 1974.

(SEAL)
Attest:

EDWARD M.FLETCHER,JR.
Attesting Officer

C. MARSHALL DANN
Commissioner of Patents